United States Patent
Puchkarev et al.

(10) Patent No.: US 11,189,050 B2
(45) Date of Patent: Nov. 30, 2021

(54) LEARNING TEMPLATE REPRESENTATION LIBRARIES

(71) Applicant: Google LLC, Mountain View, CA (US)

(72) Inventors: Victor Grigorievitch Puchkarev, Freedom, PA (US); Andrew Morgan, Redwood Estates, CA (US)

(73) Assignee: Google LLC, Mountain View, CA (US)

(*) Notice: Subject to any disclaimer, the term of this patent is extended or adjusted under 35 U.S.C. 154(b) by 45 days.

(21) Appl. No.: 16/049,410

(22) Filed: Jul. 30, 2018

(65) Prior Publication Data

US 2020/0034984 A1 Jan. 30, 2020

(51) Int. Cl.
*G06T 7/73* (2017.01)
*G06T 7/11* (2017.01)

(52) U.S. Cl.
CPC .......... *G06T 7/74* (2017.01); *G06T 7/11* (2017.01); *G06T 2207/20081* (2013.01); *G06T 2207/20132* (2013.01); *G06T 2207/20152* (2013.01)

(58) Field of Classification Search
CPC ........... G06K 9/00671; G06K 9/00771; G06K 9/00785; G06K 19/06037; G06K 2209/15; G06K 2209/23; G06K 7/1417; G06K 9/00; G06K 9/00201; G06K 9/00335; G06K 9/00791; G06K 9/00805; G06K 9/00825; G06K 9/209; G06K 9/28; G06K 9/32; G06K 9/3233; G06K 9/3241; G06K 9/52;
(Continued)

(56) References Cited

U.S. PATENT DOCUMENTS 9,349,076 B1 * 5/2016 Liu ..................... G06K 9/6256
2014/0118536 A1 * 5/2014 Morin ................ H04N 1/32117
348/135
(Continued)

FOREIGN PATENT DOCUMENTS

CN 102917126 2/2013
EP 3258441 12/2017

OTHER PUBLICATIONS

Rios-Cabrera Reyes et al: "Discriminatively Trained Templates for 3D Object Detection: A Real Time Scalable Approach", ICCV—2013 IEEE International Conference on Computer Vision, Sydney, NSW, Australia,, Dec. 1, 2013 (Dec. 1, 2013), pp. 2048-2055, XP032572827, ISSN: 1550-5499, DOI: 10.1109/ICCV.2013.256.*
(Continued)

*Primary Examiner* — Golam Sorowar
(74) *Attorney, Agent, or Firm* — Fish & Richardson P.C.

(57) ABSTRACT

Methods, systems, and apparatus, including computer programs encoded on a computer storage medium, for learning template representation libraries. In one aspect, a method includes obtaining an image depicting a physical environment, where the environment includes a given physical object. When possible, a position of the given object in the environment is inferred based on a template representation library using template matching techniques. In response to determining that the position of the given object in the environment cannot be inferred based on the template representation library using template matching techniques, the
(Continued)

template representation library is automatically augmented with new template representations.

17 Claims, 3 Drawing Sheets

(58) Field of Classification Search
CPC ....... G06K 9/6201; G06T 19/006; G06T 7/73; G06T 17/00; G06T 17/05; G06T 17/20; G06T 19/20; G06T 2200/04; G06T 2200/24; G06T 2200/32; G06T 2207/10016; G06T 2207/10024; G06T 2207/20032; G06T 2207/20081; G06T 2207/20152; G06T 2207/30201; G06T 2207/30232; G06T 2207/30241; G06T 2207/30; G05D 1/0088; G05D 1/0231; G05D 1/0246; G05D 1/0221; G05D 1/0248; G05D 1/0251; G05D 1/0274; G05D 1/0287; G05D 2201/0209; G05D 2201/0212; G05D 2201/0213
See application file for complete search history.

(56) References Cited

U.S. PATENT DOCUMENTS

| | | | |
|---|---|---|---|
| 2016/0110625 A1* | 4/2016 | Vaughan | G06T 7/11 382/103 |
| 2017/0077765 A1* | 3/2017 | Bell | H02J 50/60 |
| 2018/0165831 A1* | 6/2018 | Kwant | G05D 1/0251 |
| 2018/0365888 A1* | 12/2018 | Satzoda | G06N 3/0454 |
| 2019/0250627 A1* | 8/2019 | Witt | G06N 7/005 |

OTHER PUBLICATIONS

PCT International Search Report and Written Opinion in International Application No. PCT/US2019/042526, dated Oct. 16, 2019, 16 pages.

Reyes et al, "Discriminatively Trained Templates for 3D Object Detection: A Real Time Scalable Approach", IEEE International Conference on Computer Vision, Dec. 2013, 8 pages.

* cited by examiner

LEARNING TEMPLATE REPRESENTATION LIBRARIES

BACKGROUND

This specification relates to processing data using digital image processing methods.

A computer can model an environment by processing data characterizing the environment using digital image processing methods. Data characterizing the environment can be, for example, image data depicting the environment. The computer can use an environment model as a basis for interacting with the environment. For example, a computer can interact with an environment using robotic actuators.

SUMMARY

This specification describes a system implemented as computer programs on one or more computers in one or more locations that learns a template representation library.

According to a first aspect there is provided a method for learning a template representation library. The method includes obtaining a first image depicting a physical environment, where the environment includes a given physical object. The method includes attempting to infer a position of the given object in the environment based on a template representation library using template matching techniques, where the template representation library includes multiple template representations. In response to determining that the position of the given object in the environment cannot be inferred based on the template representation library using template matching techniques, a reconstruction of the environment is generated from multiple images of the environment. The reconstruction of the environment characterizes a geometry of the environment. An estimated position of the given object is determined using the reconstruction of the environment. A new template representation of the given object is generated using the estimated position of the given object. The template representation library is augmented with the new template representation.

In some implementations, determining whether a position of the given object in the environment can be inferred based on the template representation library using template matching techniques includes, for each of multiple template representations from the template representation library, determining whether a similarity measure between the template representation and a region of the first image exceeds a threshold.

In some implementations, generating a reconstruction of the environment from multiple images of the environment includes applying stereo reconstruction techniques to the images of the environment.

In some implementations, the reconstruction of the environment includes multiple coordinates defining a three-dimensional reconstruction of the environment.

In some implementations, determining the estimated position of the given object using the reconstruction of the environment includes determining a segmentation of the environment into multiple segmented regions based on the reconstruction of the environment. A segmented region is identified as the given object. The estimated position of the given object is determined based on the segmented region identified as the given object.

In some implementations, determining a segmentation of the environment into multiple regions based on the reconstruction of the environment includes determining a watershed transformation of an image representing the reconstruction of the environment.

In some implementations, generating a new template representation of the given object using the estimated position of the given object includes cropping a region of an image of the environment defined by the estimated position of the given object.

In some implementations, the method includes physically interacting with the environment based on the estimated position of the given object determined using the reconstruction of the environment. An interaction success condition is determined. New template representations of the given object are not determined using the estimated position of the given object if the interaction does not satisfy the interaction success condition.

In some implementations, physically interacting with the environment based on the estimated position of the given object determined using the reconstruction of the environment includes attempting to manipulate the given object using a robotic actuator based on the estimated position of the given object determined using the reconstruction of the environment.

According to a second aspect there is provided a system including a memory storing instructions that are executable and one or more computers to execute the instructions to perform the operations of the previously described method.

According to a third aspect there are provided one or more non-transitory computer storage media storing instructions that when executed by one or more computers cause the one or more computers to perform the operations of the previously described method.

Particular embodiments of the subject matter described in this specification can be implemented so as to realize one or more of the following advantages.

The system described in this specification can, with little to no human intervention, construct a template representation library that can be used by an agent (e.g., a mechanical agent) to interact with an environment. More specifically, whenever the system determines the current template representation library is inadequate to infer the position of an object of interest in the environment using template matching techniques, the system can automatically generate new template representations representing the object of interest and augment the template representation library with the new template representations. In contrast, some conventional systems lack a mechanism to automatically recover when the conventional system determines the template representation library is inadequate to infer the position of an object of interest in the environment using template matching techniques. In some of these conventional systems, manual human intervention is required to generate new template representations to augment the template representation library. The system described in this specification obviates the need for manual human intervention in constructing template representation libraries. Any of the advantages above constitute an improvement in the field of computer vision technology.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system for building a template representation library which an agent (e.g., a robotic agent) can use to interact with a physical environment. More specifically, the agent can use the template representation library to infer the locations of objects of interest in the environment using template matching techniques, and subsequently interact with these objects of interest (e.g., by picking them up using a mechanical gripping device).

When the current template representation library is inadequate to infer the position of an object of interest in the environment, the system can automatically (i.e., with little to no manual human intervention) augment the template representation library with new template representations representing the object of interest. To generate the new template representations, the system captures multiple images of the environment, generates a reconstruction of the environment (e.g., a three-dimensional (3D) reconstruction), and determines the position of the object of interest from the reconstruction of the environment. After determining the position of the object of interest from the reconstruction of the environment, the system can determine the new template representations by cropping regions which depict the object of interest from the captured images of the environment.

These features and other features are described in more detail below.

Figure 1:
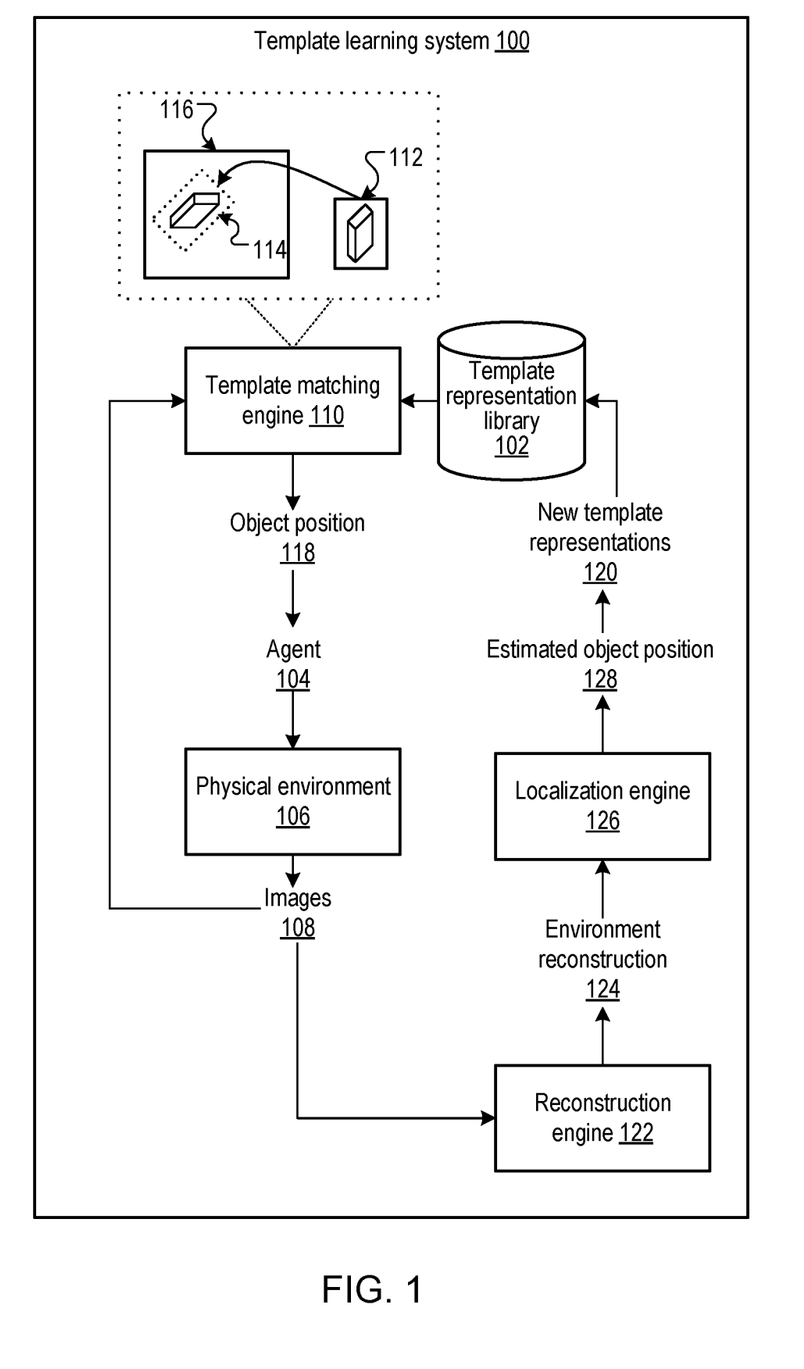
FIG. 1 is a block diagram of an example template learning system.

FIG. 1 shows an example template learning system 100. The template learning system 100 is an example of a system implemented as computer programs on one or more computers in one or more locations in which the systems, components, and techniques described below are implemented.

The template learning system 100 is configured to learn a template representation library 102. A template representation library 102 is a collection of image data, and the image data may be of different types, depending on the implementation used. In some implementations, the template representation library 102 is a collection of images which each depict a respective physical object (e.g., a computer hardware component, a machine part, or a manufacturing tool). In some implementations, the template representation library 102 is a collection of feature representations which are each derived from an image depicting a respective physical object. A feature representation derived from an image may include, for example, data indicating the positions of points of interest and line segments in the image. In some implementations, the template representation library 102 defines one or more models of common features that span multiple images depicting a respective physical object. The components of the template representation library 102 (which can be images, feature representations, and the like) are referred to in this specification as template representations.

In some cases, each template representation in the template representation library 102 represents a same type of object, while in other cases, different template representations in the template representation library 102 represent different types of objects. Each template representation may represent a respective object while excluding a representation of the background of the object (e.g., the background depicting an area surrounding the respective object). The template representations in the template representation library 102 may differ from one to another based on factors including: (i) the lighting when the image used to generate the template representation was captured, (ii) the perspective (e.g., location and angle) of the camera which captured the image used to generate the template representation, (iii) the resolution of the image used to generate the template representation, (iv) the color balance of the image used to generate the template representation, and (v) the object depicted in the image used to generate the template representation, amongst others.

An agent 104 can use the template representation library 102 to determine the position of a physical object of interest in a physical environment 106. Determining the position of the object of interest in the environment 106 can allow the agent to physically interact with the object of interest. For example, the environment 106 may be a warehouse environment and the agent 104 may be a robotic agent interacting with the environment by picking up objects of interest and moving them to different locations in the environment 106. As another example, the environment 106 may be a manufacturing environment and the agent 104 may be a robotic agent interacting with the environment by assembling objects of interest into manufactured products on an assembly line.

To determine the position of the object of interest, the system 100 captures one or more images 108 of the environment 106. The system 100 may sequentially capture the images 108 of the environment 106 by repeatedly changing the perspective of the camera capturing the images 108. For example, the system 100 may sequentially capture the images 108 of the environment 106 by moving the camera capturing the images 108 in a predetermined sequence of different perspectives (e.g., in a spiral shape).

For each image 108 of the environment 106, the system processes the image 108 using a template matching engine 110 to determine whether the position of the object of interest in the image 108 can be inferred based on the template representation library 102 using template matching techniques. That is, the template matching engine 110 uses template matching techniques to determine whether any of the template representations in the template representation library 102 "match" any of the regions of any of the images 108. More specifically, the template matching engine 110 determines whether a similarity measure (which can be represented as a numerical value) between any of the template representations from the template representation library 102 and any of the regions of the images 108 exceeds a given threshold. As an illustrative example, the template matching engine 110 may determine that the example template representation image 112 (which depicts a rectangular object) matches the region 114 of the image 116 (which also depicts a rectangular object). As will be described in more detail with reference to FIG. 2, the template matching engine 110 can use any appropriate template matching technique, for example, an interest point template matching technique, a cross correlation template matching technique, a sum-of-absolute-differences template matching technique, or a combination thereof.

When the template matching engine 110 determines that the position of the object of interest in an image 108 can be inferred based on the template representation library 102 using template matching techniques, the template matching engine 110 outputs data defining the position 118 of the object of interest in the image 108. For example, the data defining the position 118 of the object of interest in an image 108 may include coordinates of the center of the object of interest, coordinates defining a long- and short-axis of the object of interest, or both. The agent 104 can use the determined position 118 of the object of interest to physically interact with the object of interest. For example, the agent 104 can manipulate the object of interest (e.g., by picking it up) using a robotic actuator (e.g., a mechanical gripping device).

In some cases, the system 100 may determine that the current template representation library 102 is inadequate to infer the position 118 of the object of interest using template matching techniques. That is, the template matching engine 110 may determine that none of the template representations in the template representation library 102 match any of the regions of any of the captured images 108 of the environment. The current template representation library 102 may be inadequate because, for example, the object of interest includes features (e.g., shape, color, ports, accessories, and the like) that are not included in the objects represented by any of the current template representations (i.e., template representations currently included in the template representation library 102). As another example, the current template representation library 102 may be inadequate because the images 108 of the environment depict the object of interest from perspectives which are different from those of the images used to generate the current template representations.

When the system 100 determines that the current template representation library 102 is inadequate to infer the position 118 of the object of interest using template matching techniques, the system 100 can automatically augment the template representation library 102 with new template representations 120 while requiring little manual human intervention, or even no manual human intervention. The new template representations 120 enhance the template representation library 102 since they characterize the object of interest differently than the current template representations. For example, the new template representations 120 may be images which depict the object of the interest from different perspectives than the current template representations. As another example, the object of interest represented by the new template representations 120 may be a type of object which is not represented by any of the current template representations. After augmenting the template representation library 102 with the new template representations 120, the template matching engine 110 can use the augmented template representation library 102 to infer the positions of other objects of interest in the environment 106 in the future.

To determine the new template representations 120, the system 100 provides the images 108 of the environment 106 to a reconstruction engine 122. The reconstruction engine 122 is configured to process the images 108 to generate a reconstruction 124 of the environment 106 which characterizes a geometry of the environment 106. For example, the reconstruction 124 of the environment 106 may characterize a three-dimensional (3D) structure of the environment 106 by multiple 3D coordinates (e.g., coordinates with x, y, and z components) defining various positions on surfaces in the environment 106. The reconstruction engine 122 may generate the reconstruction 124 of the environment 106 using any appropriate reconstruction technique, for example, stereo reconstruction techniques.

The system 100 provides the reconstruction 124 of the environment 106 to a localization engine 126 which is configured to process the reconstruction 124 to determine an estimated position 128 of the object of interest in the environment 106. For example, as will be described in more detail with reference to FIG. 3, the localization engine 126 may determine a segmentation of the environment 106 into multiple different segmented regions, where each segmented region represents a respective object or a background area. After determining the segmentation of the environment 106, the localization engine 126 identifies one of the segmented regions to be the object of interest using, for example, prior knowledge about the expected shape and the expected position of the object of interest. For example, the expected shape of the object of interest may be approximately rectangular and the expected position of the object of interest may be approximately in the "center" of the environment (e.g., in some frame of reference of the environment). In this example, the localization engine 126 may identify the segmented region which most closely conforms with the expected shape of the object of interest, the expected position of the object of interest, or both, as the object of interest.

After identifying a segmented region of the environment 106 as the object of interest, the localization engine can determine the estimated position 128 of the object of interest using the segmented region (as will be described in more detail with reference to FIG. 3). The estimated position 128 of the object of interest determined by the localization engine 126 may be represented in any appropriate numerical format, and may be expressed with reference to any predetermined frame of reference of the environment. For example, the estimated position 128 of the object of interest may be defined by, for example, coordinates of the center of the object of interest, coordinates defining a long- and short-axis of the object of interest, or both.

After determining the estimated position 128 of the object of interest from the reconstruction 124 of the environment, the system 100 can generate the new template representations 120 using the estimated position 128 of the object of interest. More specifically, the system 100 can generate the new template representations 120 by determining respective regions of the images 108 of the environment which, according to the estimated position 128, depict the object of interest. The system 100 can crop these respective regions in the images 108 of the environment which depict the object of interest and determine new template representations 120 from the cropped image regions. For example, the system 100 can determine the new template representations 120 to be the cropped image regions. As another example, the system 100 can determine the new template representations 120 to be feature representations derived from the cropped image regions.

Optionally, prior to generating the new template representations 120, the agent 104 can attempt to physically interact with the environment 106 based on the estimated position 128 of the object of interest determined by the localization engine 126 from the reconstruction 124 of the environment 106. For example, the agent 104 can attempt to manipulate the object of interest (e.g., by picking it up) using a robotic actuator (e.g., a mechanical gripping device) based on the estimated position 128 of the object of interest. The system 100 may evaluate the success of the attempted interaction (e.g., by determining whether the agent successfully picked up the object of interest), and may refrain from generating the new template representations 120 using the estimated position 128 if the interaction is determined to be unsuccessful. In this manner, the system 100 can avoid augmenting the template representation library 102 with erroneous new template representations when the system 100 is unable to accurately estimate the position of the object of interest from the reconstruction 124 of the environment 106.

By repeatedly augmenting the template representation library 102 with new template representations 120, the system 100 can progressively construct a comprehensive template representation library 102. In some cases, the template representation library 102 may initially be empty, in which case each template representation eventually included in the template representation library 102 was at one point a new template representation 120 generated by the system 100. In other cases, the template representation library 102 may be initialized with a set of multiple default template representations (e.g., manually acquired images).

Figure 2:
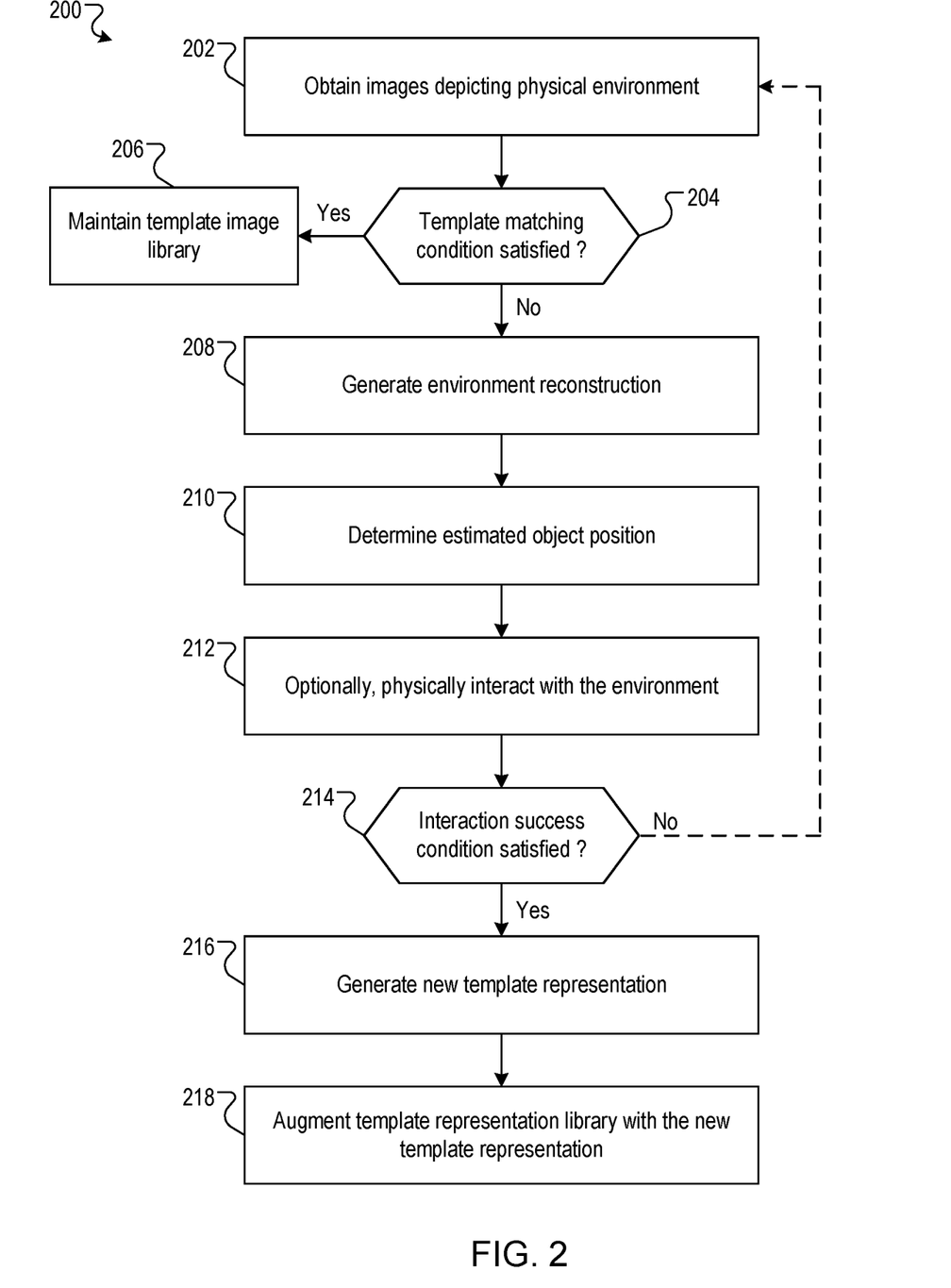
FIG. 2 is a flow diagram of an example process for augmenting a template representation library with a new template representation.

FIG. 2 is a flow diagram of an example process for augmenting a template representation library with a new template representation. For convenience, the process 200 will be described as being performed by a system of one or more computers located in one or more locations. For example, a template learning system, e.g., the template learning system 100 of FIG. 1, appropriately programmed in accordance with this specification, can perform the process 200.

The system obtains one or more images depicting the physical environment (202). The environment may be, for example, a warehouse environment or a manufacturing environment. The physical environment includes a physical object of interest (e.g., a computer hardware component, a machine part, or a manufacturing tool). The images may be represented in any appropriate format, for example, as grayscale images or color images (e.g., red-green-blue (RGB) images). The system may sequentially capture the images of the environment by repeatedly changing the perspective of the camera capturing the images. For example, the system may sequentially capture the images of the environment by moving the camera capturing the images in a predetermined sequence of different perspectives (e.g., in a spiral shape).

For each of the images of the environment, the system determines whether the position of the object of interest in the image can be inferred based on the template representation library using template matching techniques (i.e., whether a template matching condition is satisfied) (204). For a given image of the environment, the system may determine that the position of the object of interest in the image can be inferred based on the template representation library if any of the template representations in the template representation library match any of the regions of the image of the environment. More specifically, the system may determine that the position of the object of interest in an image of the environment can be inferred based on the template representation library if a similarity measure between any of the template representations and any of the regions of the image of the environment exceeds a given threshold.

The system can use any appropriate template matching technique, for example, an interest point template matching technique, a cross correlation template matching technique, a sum-of-absolute-differences template matching technique, or a combination thereof. In a particular example, the template representations may be images and the system can apply an interest point template matching technique. In this example, the system processes a template representation and an image of the environment to determine respective interest points in each image. An interest point refers to a coordinate defining a location of a corner, a blob, or any other distinctive image feature. The system can determine that the template representation matches a given region of the image of the environment if applying an affine transformation to the interest points of the template representation cause them to align (either approximately or exactly) with at least a threshold number of interest points of the image in the given region.

If the system determines the position of the object of interest can be inferred from the images of the environment based on the template representation library using template matching techniques, the system maintains the current template representation library (206). The system can provide the position of the object of interest to the agent, which can subsequently manipulate the object of interest (e.g., by picking it up) using a robotic actuator (e.g., a mechanical gripping device). The system can represent the position of the object of interest by, for example, the coordinates of the center of the object of interest, coordinates defining a long- and short-axis of the object of interest, or both. Optionally, rather than maintaining the current template representation library in response to determining that the position of the object of interest can be inferred from the images of the environment based on the template representation library, the system can augment the template representation library with new template representations determined from the obtained images of the environment. In this manner, the system can enhance the robustness of the template representation library even when the template representation library is adequate to infer the position of the object of interest.

If the system determines the position of the object of interest cannot be inferred from the images of the environment based on the template representation library using template matching techniques, the system generates a reconstruction of the environment which characterizes a geometry of the environment (208). For example, the reconstruction of the environment may characterize a 3D structure of the environment by a plurality of 3D coordinates (e.g., coordinates with x, y, and z components) defining various positions on surfaces in the environment. The system may generate the reconstruction of the environment using any appropriate reconstruction technique. In a particular example, the system may generate the reconstruction of the environment using stereo reconstruction techniques. Stereo reconstruction techniques can process a pair of images of the environment taken from different viewpoints and "triangulate" respective coordinates defining various positions on surfaces in the environment.

The system determines an estimated position of the object of interest using the reconstruction of the environment (210). As will be described in more detail with reference to FIG. 3, the system can determine the position of the object of interest by determining a segmentation of the environment into multiple different segmented regions. The system can identify one of the segmented regions as the object of interest using prior knowledge about the expected shape and expected position of the object of interest in the environment. After identifying a segmented region as the object of interest, the system can determine the estimated position of the object of interest from the segmented region.

Optionally, the agent can attempt to physically interact with the environment based on the estimated position of the object of interest (e.g., as determined in 210) (212). For example, the agent can attempt to manipulate the object of interest (e.g., by picking it up) using a robotic actuator (e.g., a mechanical gripping device) based on the estimated position of the object of interest.

The system may evaluate the success of the attempted interaction by determining whether an interaction success condition is satisfied (214). For example, the system may determine the interaction success condition is satisfied if the agent successfully picks up the object of the interest (e.g., using a mechanical gripping device). In response to determining the interaction success condition is satisfied, the system infers that the estimated position of the object (e.g., as determined in 210) accurately localizes the object, and thereafter generate new template representations representing the object of interest using the estimated position of the object of interest (216).

To generate a new template representation representing the object of interest using the estimated position of the object of interest, the system can determine a region of an image of the environment which, according to the estimated position of the object of interest, depicts the object of interest. After determining a region of an image of the environment which depicts the object of interest using the estimated position of the object of interest, the system can generate a new template representation by cropping the determined region from the image of the environment. The system can thereafter generate the new template representation from the cropped image region. For example, the system can generate the new template representation by determining the new template representation to be the cropped image region. As another example, the system can generate the new template representation by deriving a feature representation of the cropped image region (e.g., including data defining points of interest and line segments in the cropped image region). After generating the new template representations, the system can augment the template representation library with the new template representations (218).

In response to determining the interaction success condition is not satisfied (e.g., because the agent failed to pick up the object of interest), the system determines that the estimated position of the object of interest (e.g., as determined in 210) may be inaccurate. The system can return to step 202 and repeat the preceding steps to obtain a different (and ideally, more accurate) estimate of the position of the object of interest.

Figure 3:
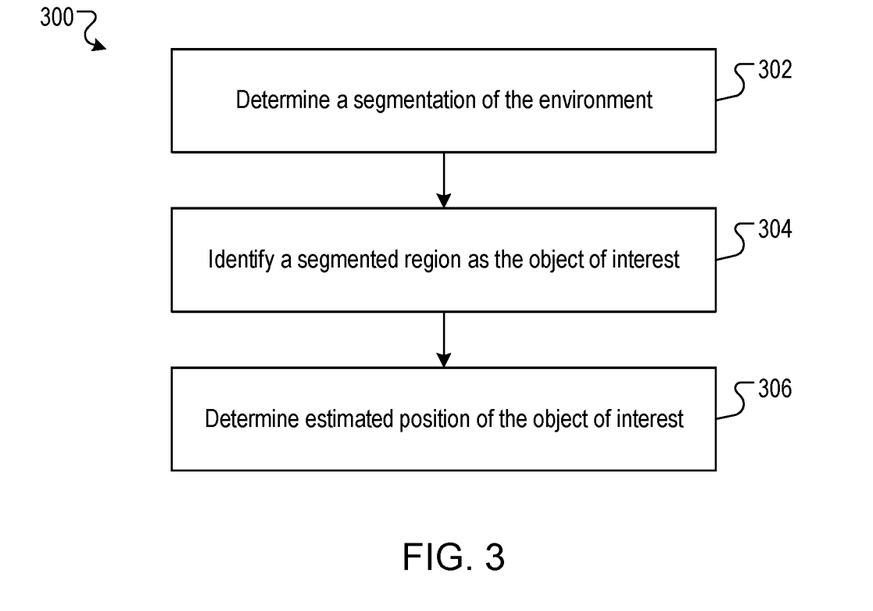
FIG. 3 is a flow diagram of an example process for determining an estimated position of an object of interest from a reconstruction of the environment.

FIG. 3 is a flow diagram of an example process for determining an estimated position of an object of interest from a reconstruction of the environment. For convenience, the process 300 will be described as being performed by a system of one or more computers located in one or more locations. For example, a template learning system, e.g., the template learning system 100 of FIG. 1, appropriately programmed in accordance with this specification, can perform the process 300.

The system uses the reconstruction of the environment (e.g., as determined in 208) to determine a segmentation of the environment into multiple different regions (302). Each segmented region may represent a respective object or a background area of the environment. For example, if the environment is a manufacturing environment including an assembly line conveyor belt, then the segmented regions may correspond to portions of the conveyor belt and various objects sitting on the conveyor belt. The system may determine the segmentation of the environment using any appropriate segmentation technique. For example, the system may apply a watershed transformation to an image representing the reconstruction of the environment. Applying a watershed transformation to an image generates a segmentation of the image into different regions which are separated by edges (i.e., areas of high image intensity gradient magnitude).

The system identifies a segmented region of the environment as the object of interest (304). To identify a segmented region as the object of interest, the system may rely on prior knowledge about the expected shape and the expected position of the object of interest in the environment. For example, the expected shape of the object of interest may be approximately rectangular and the expected position of the object of interest may be approximately in the "center" of the environment (e.g., based on some frame of reference of the environment). In this example, the system may identify a segmented region which most closely confirms with the expected shape of the object of interest, the expected position of the object of interest, or both, as the object of interest.

The system determines the estimated position of the object of interest based on the segmented region of the environment identified as the object of interest (306). For example, if the estimated position of the object of interest is defined by the coordinates of the center of the object of interest, the system can determine the estimated position of the object of interest by computing the center of mass of the segmented region identified as the object of interest. As another example, if the estimated position of the object of interest is additionally defined by coordinates defining a long- and short-axis of the object of interest, the system can determine the estimated position of the object of interest by computing the long- and short-axes of the segmented region identified as the object of interest.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by a data processing apparatus, the method comprising:
    obtaining a first image depicting a physical environment, wherein the environment comprises a given physical object;
    determining whether a position of the given object in the environment can be inferred based on a template representation library by applying template matching techniques to the first image, comprising, for each of a plurality of template representations from the template representation library:
        determining whether a similarity measure between the template representation and a region of the first image exceeds a threshold,
    wherein the template representation library comprises a plurality of template representations of respective objects;
    in response to determining that the position of the given object in the environment cannot be inferred based on the template representation library using template matching techniques:
        obtaining a plurality of images of the environment;
        generating a three-dimensional reconstruction of the environment from the plurality of images of the environment, wherein the three-dimensional reconstruction of the environment characterizes a geometry of the environment;
        determining an estimated position of the given object using the three-dimensional reconstruction of the environment;
        generating a new template representation of the given object using the estimated position of the given object that is determined from the three-dimensional reconstruction of the environment, comprising:
            identifying, from an image of the environment, a region of the image that is predicted to depict the given object based on the estimated position of the given object that is determined from the three-dimensional reconstruction of the environment; and
            generating the new template representation of the given object from the identified image region that is predicted to depict the given object; and
        augmenting the template representation library with the new template representation.

2. The method of claim 1, wherein generating a three-dimensional reconstruction of the environment from the plurality of images of the environment comprises:
    applying stereo reconstruction techniques to the plurality of images of the environment.

3. The method of claim 1, wherein the three-dimensional reconstruction of the environment comprises a plurality of coordinates defining the three-dimensional reconstruction of the environment.

4. The method of claim 1, wherein determining the estimated position of the given object using the three-dimensional reconstruction of the environment comprises:
    determining a segmentation of the environment into a plurality of segmented regions based on the three-dimensional reconstruction of the environment;
    identifying a segmented region as the given object; and
    determining the estimated position of the given object based on the segmented region identified as the given object.

5. The method of claim 4, wherein determining a segmentation of the environment into a plurality of segmented regions based on the three-dimensional reconstruction of the environment comprises:
    determining a watershed transformation of the three-dimensional reconstruction of the environment.

6. The method of claim 1, wherein generating the new template representation of the given object from the identified image region that is predicted to depict the given object comprises:
    cropping the identified image region that is predicted to depict the given object.

7. The method of claim 1, further comprising:
    physically interacting with the environment based on the estimated position of the given object that is determined from the three-dimensional reconstruction of the environment; and
    determining whether the interaction satisfies an interaction success condition; and
    refraining from generating the new template representation of the given object using the estimated position of the given object if the interaction does not satisfy the interaction success condition.

8. The method of claim 7, wherein physically interacting with the environment based on the estimated position of the given object that is determined from the three-dimensional reconstruction of the environment comprises:
    attempting to manipulate the given object using a robotic actuator based on the estimated position of the given object that is determined from the three-dimensional reconstruction of the environment.

9. The method of claim 1, wherein each template representation comprises an image of a respective object.

10. A system comprising:
a memory storing instructions that are executable; and
one or more computers to execute the instructions to perform operations comprising:
   obtaining a first image depicting a physical environment, wherein the environment comprises a given physical object;
   determining whether a position of the given object in the environment can be inferred based on a template representation library by applying template matching techniques to the first image, comprising, for each of a plurality of template representations from the template representation library:
      determining whether a similarity measure between the template representation and a region of the first image exceeds a threshold,
   wherein the template representation library comprises a plurality of template representations of respective objects;
   in response to determining that the position of the given object in the environment cannot be inferred based on the template representation library using template matching techniques:
      obtaining a plurality of images of the environment;
      generating a three-dimensional reconstruction of the environment from the plurality of images of the environment, wherein the three-dimensional reconstruction of the environment characterizes a geometry of the environment;
      determining an estimated position of the given object using the three-dimensional reconstruction of the environment;
      generating a new template representation of the given object using the estimated position of the given object that is determined from the three-dimensional reconstruction of the environment, comprising:
         identifying, from an image of the environment, a region of the image that is predicted to depict the given object based on the estimated position of the given object that is determined from the three-dimensional reconstruction of the environment; and
         generating the new template representation of the given object from the identified image region that is predicted to depict the given object; and
      augmenting the template representation library with the new template representation.

11. The system of claim 10, wherein generating a three-dimensional reconstruction of the environment from the plurality of images of the environment comprises:
   applying stereo reconstruction techniques to the plurality of images of the environment.

12. The system of claim 10, wherein the three-dimensional reconstruction of the environment comprises a plurality of coordinates defining the three-dimensional reconstruction of the environment.

13. The system of claim 10, wherein determining the estimated position of the given object using the three-dimensional reconstruction of the environment comprises:
   determining a segmentation of the environment into a plurality of segmented regions based on the three-dimensional reconstruction of the environment;
   identifying a segmented region as the given object; and
   determining the estimated position of the given object based on the segmented region identified as the given object.

14. The system of claim 13, wherein determining a segmentation of the environment into a plurality of segmented regions based on the three-dimensional reconstruction of the environment comprises:
   determining a watershed transformation of the three-dimensional reconstruction of the environment.

15. One or more non-transitory computer storage media storing instructions that when executed by one or more computers cause the one or more computers to perform operations comprising:
   obtaining a first image depicting a physical environment, wherein the environment comprises a given physical object;
   determining whether a position of the given object in the environment can be inferred based on a template representation library by applying template matching techniques to the first image, comprising, for each of a plurality of template representations from the template representation library:
      determining whether a similarity measure between the template representation and a region of the first image exceeds a threshold,
   wherein the template representation library comprises a plurality of template representations of respective objects;
   in response to determining that the position of the given object in the environment cannot be inferred based on the template representation library using template matching techniques:
      obtaining a plurality of images of the environment;
      generating a three-dimensional reconstruction of the environment from the plurality of images of the environment, wherein the three-dimensional reconstruction of the environment characterizes a geometry of the environment;
      determining an estimated position of the given object using the three-dimensional reconstruction of the environment;
      generating a new template representation of the given object using the estimated position of the given object that is determined from the three-dimensional reconstruction of the environment, comprising:
         identifying, from an image of the environment, a region of the image that is predicted to depict the given object based on the estimated position of the given object that is determined from the three-dimensional reconstruction of the environment; and
         generating the new template representation of the given object from the identified image region that is predicted to depict the given object; and
      augmenting the template representation library with the new template representation.

16. The non-transitory computer storage media of claim 15, wherein generating a three-dimensional reconstruction of the environment from the plurality of images of the environment comprises:
   applying stereo reconstruction techniques to the plurality of images of the environment.

17. The non-transitory computer storage media of claim 15, wherein generating the new template representation of the given object from the identified image region that is predicted to depict the given object comprises:
   cropping the identified image region that is predicted to depict the given object.

* * * * *